US012435012B2

(12) United States Patent
Pollefeyt et al.

(10) Patent No.: US 12,435,012 B2
(45) Date of Patent: Oct. 7, 2025

(54) SYNTHESIS GAS TO HYDROCARBON PROCESSES WITH NEUTRAL OR NEGATIVE CARBON DIOXIDE SELECTIVITY

(71) Applicant: Dow Global Technologies LLC, Midland, MI (US)

(72) Inventors: Glenn Pollefeyt, Hoek (NL); Davy L. S. Nieskens, Hoek (NL); Alexey Kirilin, Hoek (NL); Adam Chojecki, Hoek (NL); Joseph F. Dewilde, Midland, MI (US); Barry B. Fish, Freeport, TX (US); Andrzej Malek, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 676 days.

(21) Appl. No.: 17/788,144

(22) PCT Filed: Dec. 2, 2020

(86) PCT No.: PCT/US2020/062832
§ 371 (c)(1),
(2) Date: Jun. 22, 2022

(87) PCT Pub. No.: WO2021/133523
PCT Pub. Date: Jul. 1, 2021

(65) Prior Publication Data
US 2023/0052682 A1    Feb. 16, 2023

Related U.S. Application Data

(60) Provisional application No. 62/952,923, filed on Dec. 23, 2019.

(51) Int. Cl.
C07C 1/04    (2006.01)

(52) U.S. Cl.
CPC .............. *C07C 1/043* (2013.01); *C07C 1/046* (2013.01); *C07C 2521/06* (2013.01); *C07C 2521/16* (2013.01); *C07C 2523/08* (2013.01)

(58) Field of Classification Search
CPC ..... C07C 1/043; C07C 1/046; C07C 2521/06; C07C 2521/16; C07C 2523/08; C07C 1/04; C07C 9/02
See application file for complete search history.

(56) References Cited

U.S. PATENT DOCUMENTS

2011/0160316 A1    6/2011  Kibby

FOREIGN PATENT DOCUMENTS

CN    106660894 A    5/2017
WO    2016007607 A1    1/2016
(Continued)

OTHER PUBLICATIONS

CN 110227539A, Meng et al., bifunctional catalyst for producing C2—C4 hydrocarbon, 2019.*
(Continued)

*Primary Examiner* — Jafar F Parsa
(74) *Attorney, Agent, or Firm* — Dinsmore & Shohl, LLP

(57) ABSTRACT

A process for preparing $C_2$ to $C_4$ hydrocarbons includes introducing a feed stream into a reaction zone of a reactor, the feed stream comprising hydrogen gas and carbon monoxide. An additional stream is introduced into the reaction zone of the reactor, the additional stream comprising carbon dioxide. A combined stream that includes the feed stream and the additional stream is converted into a product stream comprising $C_2$ to $C_4$ hydrocarbons in the reaction zone in the presence of a hybrid catalyst. The hybrid catalyst includes a mixed metal oxide catalyst component, and a microporous catalyst component. The process operates at a gas hourly space velocity in excess of 2500 $hr^{-1}$ and effectively yields
(Continued)

a net carbon dioxide selectivity of less than 5.0% and a productivity of $C_2$-$C_4$ hydrocarbons greater than 75 g hydrocarbons per kilogram of catalyst per hour.

15 Claims, 2 Drawing Sheets

(56) References Cited

FOREIGN PATENT DOCUMENTS

| WO | 2018093880 A1 | 5/2018 |
|---|---|---|
| WO | 2019089206 A1 | 5/2019 |

OTHER PUBLICATIONS

Kuwait Examination Report dated Jul. 14, 2024, pertaining to KW Patent Application No. KW/P/2022/000808, 6 pgs.
Communication pursuant to Article 94(3) EPC dated Mar. 27, 2024, pertaining to EP Patent Application No. 20828724.3, 6 pgs.
Brazil Technical Report dated Nov. 28, 2024, pertaining to BR Patent Application No. BR112022011750-7, 10 pgs. (DOW83317BR).
Gulf Cooperation Council Examination Report dated Nov. 6, 2024, pertaining to GCC Patent Application No. 2020-41243, 5 pgs.
Chinese Office Action dated Aug. 31, 2023, pertaining to CN Patent Application No. 202080089463.3, 20 pgs.
Chinese Office Action dated Sep. 7, 2024, pertaining to CN Patent Application No. 2020800894633, 13 pgs.
International Search Report and Written Opinion dated Mar. 12, 2021, pertaining to Int'l Patent Application No. PCT/US2020/062832, 10 pgs.
Gao et al. "Direct Production of Lower Olefins from CO2 Conversion via Bifunctional Catalysis" ACS Catal. 2018, 8, 571-578.
Li et al. "Highly Selective Conversion of Carbon Dioxide to Lower Olefins" ACS Catal. 2017, 7, 8544-8548.
Jiao et al. "Selective conversion of syngas to light olefins" sciencemag.org, Mar. 2016, vol. 351 Issue 6277, 5 pgs.
Gao et al. "Direct conversion of CO2 into liquid fuels with high selectivity over a bifunctional catalyst" Nature Chemistry, Jun. 2017, 8 pgs.
Argentina Examination Report dated Nov. 14, 2023, pertaining to AR Patent Application No. 2020-01-03296, 2 pgs.
Chinese Office Action dated May 16, 2024, pertaining to CN Patent Application No. 202080089463.3, 16 pgs.
Saudi Arabia Substantive Examination Report dated Feb. 15, 2025, pertaining to SA Patent Application No. 522433056, 14 pgs.

\* cited by examiner

SYNTHESIS GAS TO HYDROCARBON PROCESSES WITH NEUTRAL OR NEGATIVE CARBON DIOXIDE SELECTIVITY

CROSS REFERENCE TO RELATED APPLICATIONS

This application is a national phase entry of PCT/US2020/062832 filed on Dec. 2, 2020, which claims priority to U.S. Provisional Patent Application No. 62/952,923 filed on Dec. 23, 2019, the entire disclosures of which are hereby incorporated by reference.

BACKGROUND

Field

The present specification generally relates to hybrid catalyst processes that efficiently convert various carbon-containing streams to $C_2$ to $C_4$ hydrocarbons. In particular, the present specification relates to hybrid catalyst processes that limit the amount of carbon dioxide ($CO_2$) that is produced in the process. Generally, in hybrid catalyst processes, the synthesis gas (syngas), or feed stream, comprises hydrogen ($H_2$) gas and a carbon-containing gas. A hybrid catalyst that is used in hybrid catalyst processes generally comprises a combination of a mixed metal oxide component and a molecular sieve that operate in tandem.

Technical Background

For a number of industrial applications, hydrocarbons are used, or are starting materials used, to produce plastics, fuels, and various downstream chemicals. $C_2$ to $C_4$ hydrocarbons are particularly useful in downstream applications. A variety of processes for producing these lower hydrocarbons has been developed, including petroleum cracking and various synthetic processes.

Synthetic processes for converting feed carbon to desired products, such as lower hydrocarbons, are known. Some of these processes include co-feeding $CO_2$ to the process to reduce the net $CO_2$ selectivity, determined by the $CO_2$ in the product stream less the total $CO_2$ in the feed stream, which may be negative. However, this approach typically leads to reduced productivity of the desired $C_2$ to $C_4$ hydrocarbons.

Accordingly, a need exists for processes and systems in which the net $CO_2$ selectivity is lower, while still having a sufficiently high productivity of the desired $C_2$ to $C_4$ hydrocarbons.

SUMMARY

Embodiments of the present disclosure meet this need by utilizing syngas to prepare $C_2$ to $C_4$ hydrocarbons with a net $CO_2$ selectivity of less than 5.0% by co-feeding $CO_2$ and operating at a gas hourly space velocity in excess of 2500 $hr^{-1}$. According to one embodiment, a process for preparing $C_2$ to $C_4$ hydrocarbons comprises: introducing a feed stream into a reaction zone of a reactor, the feed stream comprising $H_2$ gas and carbon monoxide (CO); introducing an additional stream into the reaction zone of the reactor, the additional stream comprising $CO_2$; and converting a combined stream comprising the feed stream and the additional stream into a product stream comprising $C_2$ to $C_4$ hydrocarbons in the reaction zone in the presence of a hybrid catalyst, the hybrid catalyst comprising: a mixed metal oxide catalyst component; and a microporous catalyst component, wherein the process operates at a gas hourly space velocity greater than 2500 $hr^{-1}$, which results in a net $CO_2$ selectivity of less than 5.0% and a productivity of $C_2$-$C_4$ hydrocarbons greater than 75 g hydrocarbons per kilogram of catalyst per hour.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter.

DETAILED DESCRIPTION

Figure 1:
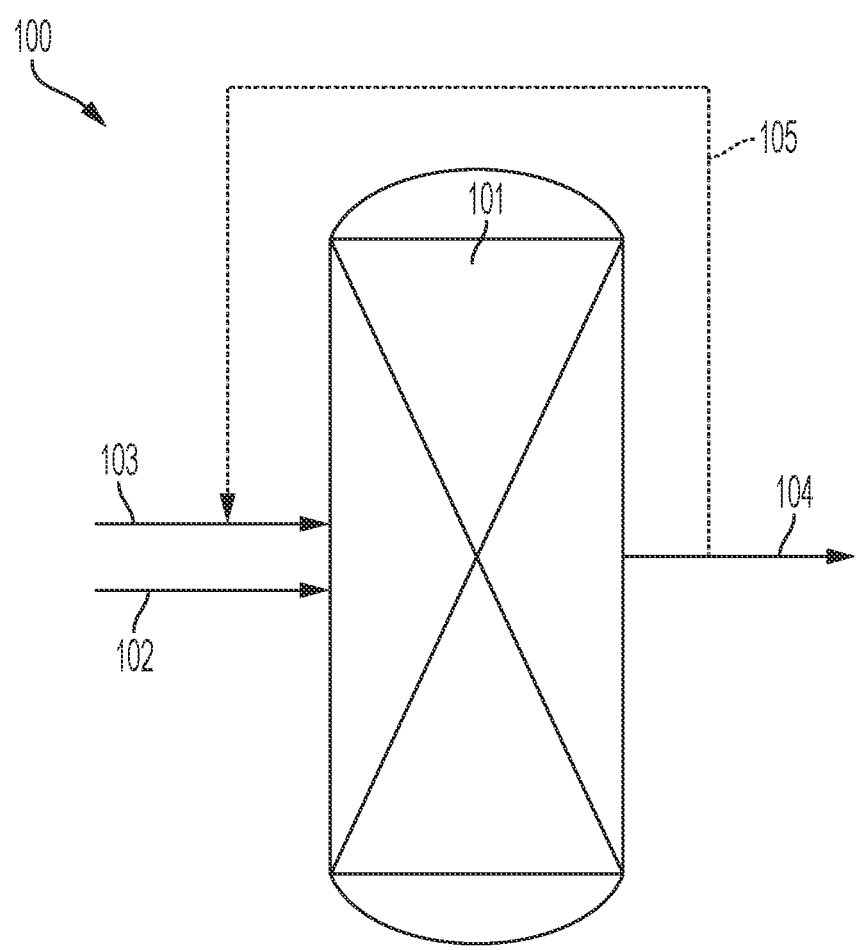
FIG. 1 is a schematic view illustrating two streams being introduced to a reactor and one resulting product stream exiting the reactor in accordance with one or more embodiments of the present disclosure.

As used herein, it is noted that "synthesis gas" and "syngas" are utilized herein to represent a mixture comprising primarily hydrogen, carbon monoxide, and very often some carbon dioxide.

Reference will now be made in detail to embodiments of processes utilizing syngas to prepare $C_2$ to $C_4$ hydrocarbons with a net $CO_2$ selectivity of less than 5.0% and a productivity of $C_2$ to $C_4$ hydrocarbons greater than 75 g hydrocarbons per kilogram of catalyst per hour by co-feeding $CO_2$ and operating at a gas hourly space velocity in excess of 2500 $hr^{-1}$. As used herein, net $CO_2$ selectivity is defined as the $CO_2$ exiting the reactor less the total $CO_2$ fed to the reactor. In one embodiment, a process for preparing $C_2$ to $C_4$ hydrocarbons comprises: introducing a feed stream into a reaction zone of a reactor, the feed stream comprising $H_2$ gas and CO; introducing an additional stream into the reaction zone of the reactor, the additional stream comprising $CO_2$; and converting a combined stream comprising the feed stream and the additional stream into a product stream comprising $C_2$ to $C_4$ hydrocarbons in the reaction zone in the presence of a hybrid catalyst, the hybrid catalyst comprising: a mixed metal oxide catalyst component; and a microporous catalyst component, by operating at a gas hourly space velocity in excess of 2500 $hr^{-1}$, resulting in a net selectivity of $CO_2$ of less than 5.0% and a productivity of $C_2$ to $C_4$ hydrocarbons greater than 75 g hydrocarbons per kilogram of catalyst per hour. In some embodiments, the additional stream comprising $CO_2$ may be a recycle stream.

The use of an additional feed of $CO_2$ to reduce net $CO_2$ selectivity when converting feed streams comprising carbon to desired products, such as, for example, $C_2$ to $C_4$ hydrocarbons, is known. In general, in syngas to hydrocarbon processes, it is desirable to achieve a high productivity of the desired $C_2$ to $C_4$ hydrocarbons, while simultaneously reducing the net selectivity of $CO_2$. A known method to reduce the net selectivity of $CO_2$ is by co-feeding $CO_2$. However, by co-feeding additional $CO_2$ to reduce the net selectivity of $CO_2$, this also results in a decreased productivity of the desired $C_2$ to $C_4$ hydrocarbons. However, the present inventors have recognized that by operating the process at a high gas hourly space velocity, for example, in excess of 2500 $hr^{-1}$, the additional $CO_2$, while still reducing net selectivity of $CO_2$, does not inhibit production of the desired $C_2$ to $C_4$ hydrocarbons.

Processes according to embodiments disclosed and described herein address the reduction of the net selectivity of $CO_2$ by introducing a stream (referred to herein as the "additional stream") in addition to the feed stream, which may be, for example, syngas, wherein the additional stream comprises $CO_2$, and operating the process at a high gas hourly space velocity, which may be, for example in excess of 2500 $hr^{-1}$. As demonstrated herein, the addition of $CO_2$ to the process and operating at a gas hourly space velocity in excess of 2500 $hr^{-1}$ lowers the net selectivity of $CO_2$, while maintaining a productivity of $C_2$ to $C_4$ hydrocarbons greater than 75 g hydrocarbons per kilogram of catalyst per hour. Syngas to hydrocarbon process with neutral or negative $CO_2$ selectivity according to embodiments will now be described in more detail.

Referring to the embodiment of FIG. 1, a feed stream 102 is fed into a reaction zone 101, the feed stream 102 may comprise $H_2$ gas and CO. In embodiments, the feed stream 102 is syngas. In some embodiments, the $H_2$ gas is present in the feed stream 102 in an amount of from 20 volume percent (vol %) to 80 vol %, based on combined volume of the $H_2$ gas and CO. In other embodiments, the $H_2$ gas is present in the feed stream 102 in an amount from 40 vol % to 80 vol % or from 60 vol % to 80 vol %, based on combined volume of $H_2$ gas and CO. The feed stream 102 is introduced into a reaction zone 101 and contacted with a hybrid catalyst as disclosed and described herein below in the reaction zone 101. The hybrid catalyst comprises a mixed metal oxide catalyst component and a microporous catalyst component.

Referring again to FIG. 1, an additional stream 103 comprising $CO_2$ is introduced into the reaction zone 101 with the feed stream 102. In embodiments, the additional stream 103 may be added to the feed stream 102 prior to introducing the feed stream 102 and additional stream 103 into the reaction zone 101, such that a combined stream comprising the feed stream 102 and the additional stream 103 are introduced into the reaction zone 101 simultaneously through the same inlet. In other embodiments, the additional stream 103 may be added to the reaction zone 101 through a different inlet than the feed stream 102, such that the feed stream 102 and the additional stream 103 are not in contact until both are present in the reaction zone 101. In either of the above-described embodiments, at some point during the syngas to hydrocarbon process both the feed stream 102 and the additional stream 103 are present in the reaction zone 101 and are contacted with the hybrid catalyst.

As disclosed herein above, the combined stream may comprise $H_2$, CO, $CO_2$, or combinations thereof. The additional stream 103 is added to the feed stream 102, or introduced into the reaction zone 101 with the feed stream 102, so that the combined stream—comprising the feed stream 102 and the additional stream 103—comprises from 10.0 vol % to 90.0 vol % $H_2$, such as from 10.0 vol % to 80.0 vol % $H_2$, from 10.0 vol % to 70.0 vol % $H_2$, from 10.0 vol % to 60.0 vol % $H_2$, from 10.0 vol % to 50.0 vol % $H_2$, from 10.0 vol % to 40.0 vol % $H_2$, or from 10.0 vol % to 30.0 vol % $H_2$. In other embodiments, the combined stream comprises from 20.0 vol % to 90.0 vol % $H_2$, such as from 30.0 vol % to 90.0 vol % $H_2$, from 40.0 vol % to 90.0 vol % $H_2$, from 50.0 vol % to 90.0 vol % $H_2$, or from 80.0 vol % to 90.0 vol % $H_2$. Yet in other embodiments, the combined stream comprises from 20.0 vol % to 80.0 vol % $H_2$, such as from 40.0 vol % to 80.0 vol % $H_2$, or from 60.0 vol % to 80.0 vol % $H_2$. In other embodiments, the combined stream comprises from 45.0 vol % to 85.0 vol % $H_2$, such as from 55.0 vol % to 85.0 vol % $H_2$ or from 65.0 vol % to 85.0 vol % $H_2$. In providing a feed stream and an additional stream to yield a combined feed stream having the above $H_2$ content, the net $CO_2$ selectivity of the reaction can be controlled so that the process using the additional stream 103 reduces the net $CO_2$ selectivity.

In traditional syngas to hydrocarbons conversion processes, $CO_2$ is at times co-fed to reduce net selectivity of $CO_2$. Without being bound to any particular theory, it is believed that the reduction in net selectivity of $CO_2$ is, at least in part, caused by manipulating the Water Gas Shift reaction (WGS) ($CO+H_2O \leftrightarrow CO_2+H_2$). Balancing the reduced net $CO_2$ selectivity and the reduced $CO_x$ conversion is, in embodiments, achieved by providing a combined stream comprising the feed stream 102 and the additional stream 103. However, by co-feeding $CO_2$, the productivity of the desired $C_2$-$C_4$ hydrocarbons is typically reduced compared to when $CO_2$ is not co-fed. Thus, even though it is known to co-feed $CO_2$ to reduce the net selectivity of $CO_2$, the reduced net selectivity of $CO_2$ also results in lower productivity of $C_2$-$C_4$ hydrocarbons. By operating the process at a high space velocity, which is the subject of the present disclosure, co-feeding $CO_2$ results in reduced net selectivity of $CO_2$ while maintaining desired productivity of the desired $C_2$-$C_4$ hydrocarbons.

Figure 2:
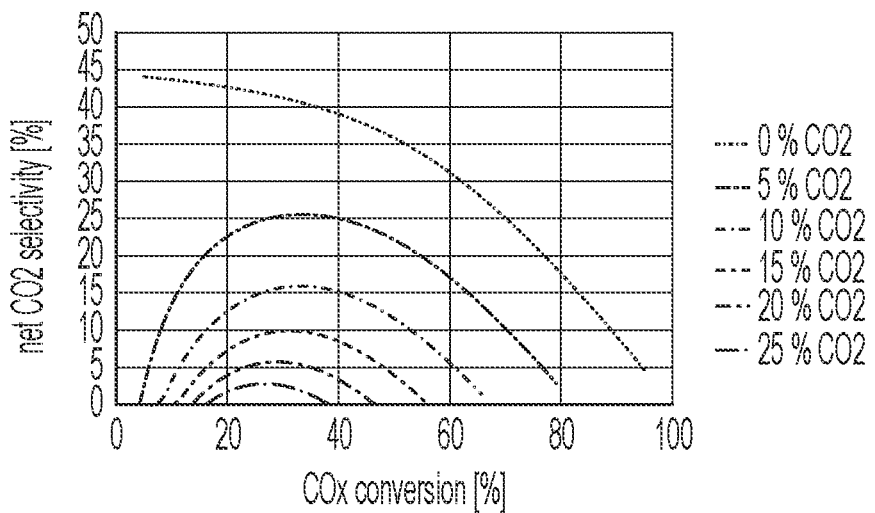
FIGS. 2 and 3 graphically depict the thermodynamic relationship between net $CO_2$ selectivity and $CO_x$ conversion when introducing a second stream comprising $CO_2$ to the reactor.
Figure 3:
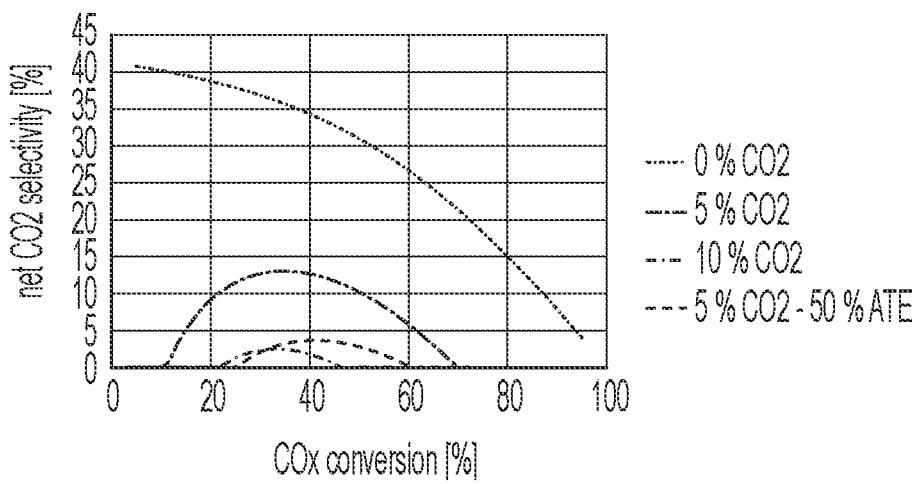

FIGS. 2 and 3 are based on thermodynamic equilibrium calculations and serve to further describe the additional feed of $CO_2$. FIG. 2 depicts the relationship between net $CO_2$ selectivity and $CO_x$ conversion at 400° C. in a single-pass syngas to hydrocarbon process. In FIG. 2, the volume ratio of $CO_2$ and $H_2$ to CO in the feed stream was equal to three. However, when manipulating the WGS reaction, as depicted in FIG. 3, the relationship between net $CO_2$ selectivity and $CO_x$ conversion at 400° C. in a single-pass syngas to hydrocarbon process results in both lower net $CO_2$ selectivity and higher $CO_x$ conversions. For example, in FIG. 3, the 5% $CO_2$-50% approach to equilibrium (ATE) of the WGS reaction line produces a much lower net $CO_2$ selectivity when compared to the 5% $CO_2$-100% ATE of the WGS reaction line. In FIG. 3, the volume ratio of $CO_2$ and $H_2$ to CO in the feed stream was equal to five. When comparing FIGS. 2 and 3, the different volume ratios of $CO_2$ and $H_2$ to CO in the feed stream result in the 5% $CO_2$ lines differing between the two graphs.

As disclosed herein above, the additional stream 103, which may include a recycle stream 105, may comprise $CO_2$. It should be understood that the $CO_2$ introduced in the additional stream 103 is in addition to any $CO_2$ present in the feed stream 102. The additional stream 103 is added to the feed stream 102, or introduced into the reaction zone 101 with the feed stream 102, so that the combined stream—comprising the feed stream 102 and the additional stream 103—comprises from 3.0 vol % to 20.0 vol % $CO_2$, such as from 3.5 vol % to 20.0 vol % $CO_2$, from 4.0 vol % to 20.0 vol % $CO_2$, from 4.5 vol % to 20.0 vol % $CO_2$, from 5.0 vol % to 20.0 vol % $CO_2$, from 5.5 vol % to 20.0 vol % $CO_2$, from 6.0 vol % to 20.0 vol % $CO_2$, from 6.5 vol % to 20.0 vol % $CO_2$, from 7.0 vol % to 20.0 vol % $CO_2$, from 7.5 vol % to 20.0 vol % $CO_2$, from 8.0 vol % to 20.0 vol % $CO_2$, from 8.5 vol % to 20.0 vol % $CO_2$, from 9.0 vol % to 20.0 vol % $CO_2$, from 9.5 vol % to 20.0 vol % $CO_2$, from 10.0 vol % to 20.0 vol % $CO_2$, from 10.5 vol % to 20.0 vol % $CO_2$, from 11.0 vol % to 20.0 vol % $CO_2$, from 11.5 vol % to 20.0 vol % $CO_2$, from 12.0 vol % to 20.0 vol % $CO_2$, from 12.5 vol % to 20.0 vol % $CO_2$, from 13.0 vol % to 20.0 vol % $CO_2$, from 13.5 vol % to 20.0 vol % $CO_2$, from 14.0 vol % to 20.0 vol % $CO_2$, from 14.5 vol % to 20.0 vol % $CO_2$, from 15.0 vol % to 20.0 vol % $CO_2$, from 15.5 vol % to 20.0 vol % $CO_2$, from 16.0 vol % to 20.0 vol % $CO_2$, from 16.5 vol % to 20.0 vol % $CO_2$, from 17.0 vol % to 20.0 vol % $CO_2$, from 17.5 vol % to 20.0 vol % $CO_2$, from 18.0 vol % to 20.0 vol % $CO_2$, from 18.5 vol % to 20.0 vol % $CO_2$, from 19.0 vol % to 20.0 vol % $CO_2$, or from 19.5 vol % to 20.0 vol % $CO_2$. In some embodiments, the combined stream comprises from 3.0 vol % to 19.5 vol % $CO_2$, such as from 3.0 vol % to 19.0 vol % $CO_2$, from 3.0 vol % to 18.5 vol % $CO_2$, from 3.0 vol % to 18.0 vol % $CO_2$, from 3.0 vol % to 17.5 vol % $CO_2$, from 3.0 vol % to 17.0 vol % $CO_2$, from 3.0 vol % to 16.5 vol % $CO_2$, from 3.0 vol % to 16.0 vol % $CO_2$, from 3.0 vol % to 15.5 vol % $CO_2$, from 3.0 vol % to 15.0 vol % $CO_2$, from 3.0 vol % to 14.5 vol % $CO_2$, from 3.0 vol % to 14.0 vol % $CO_2$, from 3.0 vol % to 13.5 vol % $CO_2$, from 3.0 vol % to 13.0 vol % $CO_2$, from 3.0 vol % to 12.5 vol % $CO_2$, from 3.0 vol % to 12.0 vol % $CO_2$, from 3.0 vol % to 11.5 vol % $CO_2$, from 3.0 vol % to 11.0 vol % $CO_2$, from 3.0 vol % to 10.5 vol % $CO_2$, from 3.0 vol % to 10.0 vol % $CO_2$, from 3.0 vol % to 9.5 vol % $CO_2$, from 3.0 vol % to 9.0 vol % $CO_2$, from 3.0 vol % to 8.5 vol % $CO_2$, from 3.0 vol % to 8.0 vol % $CO_2$, from 3.0 vol % to 7.5 vol % $CO_2$, from 3.0 vol % to 7.0 vol % $CO_2$, from 3.0 vol % to 6.5 vol % $CO_2$, from 3.0 vol % to 6.0 vol % $CO_2$, from 3.0 vol % to 5.5 vol % $CO_2$, from 3.0 vol % to 5.0 vol % $CO_2$, from 3.0 vol % to 4.5 vol % $CO_2$, from 3.0 vol % to 4.0 vol % $CO_2$, or from 3.0 vol % to 3.5 vol % $CO_2$. In still other embodiments, the combined stream comprises from 3.5 vol % to 19.5 vol % $CO_2$, such as from 4.0 vol % to 19.0 vol % $CO_2$, from 4.5 vol % to 18.5 vol % $CO_2$, from 5.0 vol % to 18.0 vol % $CO_2$, from 5.5 vol % to 17.5 vol % $CO_2$, from 6.0 vol % to 17.0 vol % $CO_2$, from 6.5 vol % to 16.5 vol % $CO_2$, from 7.0 vol % to 16.0 vol % $CO_2$, from 7.5 vol % to 15.5 vol % $CO_2$, from 8.0 vol % to 15.0 vol % $CO_2$, from 8.5 vol % to 14.5 vol % $CO_2$, from 9.0 vol % to 14.0 vol % $CO_2$, from 9.5 vol % to 13.5 vol % $CO_2$, from 10.0 vol % to 13.0 vol % $CO_2$, from 10.5 vol % to 12.5 vol % $CO_2$, or from 11.0 vol % to 12.0 vol % $CO_2$. By providing a feed stream and an additional stream 103 comprising $CO_2$ to yield a combined feed stream having the above $CO_2$ content, the net $CO_2$ selectivity of the process can be controlled.

In embodiments where the additional stream 103 comprises $CO_2$, it should be understood that the $CO_2$ introduced in the additional stream 103 is in addition to any $CO_2$ present in the feed stream 102. The additional stream 103 may comprise any amount $CO_2$ such that the combined stream—comprising the feed stream 102 and the additional stream 103—has the concentrations of $CO_2$ as disclosed hereinabove.

Introducing an additional stream 103 comprising $CO_2$ with the feed stream 102, such as, for example, syngas ($H_2$+CO), reduces the net $CO_2$ selectivity. Although only co-feeding $CO_2$ reduces the net $CO_2$ selectivity, only introducing $CO_2$ in the additional stream 103 also decreases the level of conversion of carbon to desired products (such as the conversion of feed carbon to any carbon-containing product that is not CO or $CO_2$, also referred to herein as $CO_x$ conversion). However, it was found that introducing an additional stream 103 comprising $CO_2$ together with the feed stream 102, such as, syngas and operating at a high gas hourly space velocity effectively reduces the net $CO_2$ selectivity, and significantly lowers the impact on hydrocarbon productivity, compared to the cases operated at a lower space velocity.

In embodiments, the combined stream comprising the additional stream 103 and the feed stream 102 may have an $CO_2$/CO volume ratio from 0.05 to 1.50, such as from 0.05 to 1.50, from 0.15 to 1.50, from 0.25 to 1.50, from 0.35 to 1.50, from 0.45 to 1.50, from 0.65 to 1.50, from 0.75 to 1.50, from 0.85 to 1.50, from 0.95 to 1.50, from 1.05 to 1.50, from 1.15 to 1.50, from 1.25 to 1.50, from 1.35 to 1.50, or from 1.45 to 1.50. In other embodiments, the combined stream comprising the additional stream 103 and the feed stream 102 may have a $CO_2$/CO volume ratio from 0.05 to 1.40, such as from 0.05 to 1.30, from 0.05 to 1.20, from 0.05 to 1.10, from 0.05 to 1.00, from 0.05 to 0.90, from 0.05 to 0.80, from 0.05 to 0.70, from 0.05 to 0.60, from 0.05 to 0.50, from 0.05 to 0.40, from 0.05 to 0.30, from 0.05 to 0.20, or from 0.05 to 0.10. In yet other embodiments, the combined stream comprising the additional stream 103 and the feed stream 102 may have a $CO_2$/CO volume ratio from 0.10 to 1.40, such as from 0.20 to 1.30, from 0.30 to 1.20, from 0.40 to 1.10, from 0.50 to 1.00, from 0.60 to 0.90, or from 0.70 to 0.80. In still other embodiments, the combined stream comprising the additional stream 103 and the feed stream 102 may have a $CO_2$/CO from 0.20 to 1.35, such as from 0.35 to 1.20, from 0.50 to 1.05, from 0.65 to 0.90, or from 0.70 to 0.80. The ratio of $CO_2$/CO must be high enough that there is sufficient $CO_2$ to convert carbon to $C_2$ to $C_4$ hydrocarbons and significantly decrease the net $CO_2$ selectivity.

The reaction conditions within the reaction zone 101 will now be described. The feed stream 102 and the additional stream 103 are contacted with the hybrid catalyst in the reaction zone 101 under reaction conditions sufficient to form a product stream 104 comprising $C_2$ to $C_4$ hydrocarbons. In some embodiments, the $C_2$ to $C_4$ hydrocarbons consist essentially of $C_2$ to $C_4$ olefins. The reaction conditions comprise a temperature within reaction zone 101 ranging, according to one or more embodiments, from 300° C. to 500° C., such as from 380° C. to 450° C., from 380° C. to 440° C., from 380° C. to 430° C., from 380° C. to 420° C., from 380° C. to 410° C., from 380° C. to 400° C., or from 380° C. to 390° C. In other embodiments, the temperature within the reaction zone 101 is from 390° C. to 450° C., from 400° C. to 450° C., from 410° C. to 450° C., from 420° C. to 450° C., from 430° C. to 450° C., or from 440° C. to 450° C. In yet other embodiments, the temperature within the reaction zone 101 is from 380° C. to 450° C., such as from 390° C. to 440° C., from 400° C. to 430° C., or from 410° C. to 420° C.

The reaction conditions also, in embodiments, include a pressure inside the reaction zone 101 of at least 20 bar (20,000 kilopascals (kPa)), such as at least 25 bar (25,000 kPa), at least 30 bar (30,000 kPa), at least 35 bar (35.00 kPa), at least 40 bar (40,000 kPa), at least 45 bar (45,000 kPa), at least 50 bar (50,000 kPa), at least 55 bar (55,000 kPa), at least 60 bar (60,000 kPa), at least 65 bar (65,000 kPa), or at least 70 bar (70,000 kPa). In other embodiments, the reaction conditions include a pressure inside the reaction zone 101 from 20 bar (20,000 kPa) to 70 bar (70,000 kPa), such as from 25 bar (25,000 kPa) to 65 bar (65,000 kPa), or from 30 bar (30,000 kPa) to 60 bar (60,000 kPa), from 35 bar (35,000 kPa) to 55 bar (55,000 kPa), from 40 bar (40,000 kPa) to 50 bar (50,000 kPa).

The reaction conditions also, in embodiments, include a gas hourly space velocity inside the reaction zone 101 of at least 2500 $hr^{-1}$, such as at least 3000 $hr^{-1}$, such as at least 3600 hr$^{-1}$, such as at least 4200 hr$^{-1}$, such as at least 4800 hr$^{-1}$, such as at least 5400 hr$^{-1}$, such as at least 6000 hr$^{-1}$, such as at least 6600 hr$^{-1}$, or such as at least 7200 hr$^{-1}$.

In embodiments, the reaction may have a net $CO_2$ selectivity of less than 5.0%, less than 4.0%, less than 3.0%, less than 2.0%, or less than 1.0%, or even a negative net $CO_2$ selectivity, such as less than 0.0%.

The hybrid catalyst used in the above-disclosed processes will now be described. Referring to FIG. 1, hybrid catalyst systems comprise a mixed metal oxide catalyst component, which converts the feed stream 102 and additional stream 103 to oxygenated hydrocarbons, and a microporous catalyst component (such as, for example, a zeolite component), which converts the oxygenates to hydrocarbons. The hybrid catalyst, according to embodiments, comprises a mixed metal oxide catalyst component in admixture with a microporous catalyst component that may be selected from molecular sieves having 8-MR pore access and having a framework type selected from the group consisting of the following framework types CHA, AEI, AFX, ERI, LTA, UFI, RTH, RHO, LEV, and combinations thereof, the framework types corresponding to the naming convention of the International Zeolite Association. It should be understood that in embodiments, both aluminosilicate and silicoaluminophosphate frameworks may be used. In certain embodiments, the molecular sieve may be SAPO-34 silicoaluminophosphate having a Chabazite (CHA) framework type.

Examples of these may include, but are not necessarily limited to: CHA embodiments selected from SAPO-34 and SSZ-13; and AEI embodiments such as SAPO-18. Combinations of microporous catalyst components having any of the above framework types may also be employed. It should be understood that the microporous catalyst component may have a different membered ring pore opening depending on the desired product. For instance, microporous catalyst component having 8-MR to 12-MR pore openings could be used depending on the desired product. However, to produce $C_2$ to $C_4$ hydrocarbons, a microporous catalyst component having 8-MR pore openings is used in embodiments.

In one or more embodiments, the mixed metal oxide catalyst component may be a bulk catalyst or a supported catalyst and may be made by any suitable method, such as co-precipitation, impregnation, or the like. In embodiments, the mixed metal oxide catalyst component comprises gallium (Ga). In embodiments, the mixed metal oxide catalyst component comprises zirconium (Zr). It should be understood that any metal in the mixed metal oxide component mixture can be present in a variety of oxidation states. It should also be understood that the designation of a specific oxide (e.g. $Ga_2O_3$), does not necessarily preclude the presence of an additional or different oxide of the given metal(s).

The mixed metal oxide catalyst component and the microporous catalyst component of the hybrid catalyst may be mixed together by any suitable means, such as, for example, by physical mixing—such as shaking, stirring, or other agitation. In other embodiments, the mixed metal oxide catalyst component and the microporous catalyst component may be present as a single formulated catalyst. The mixed metal oxide catalyst component and the microporous catalyst component may be present in the reaction zone 101, typically as a hybrid catalyst in a catalyst bed, in a weight/weight (wt/wt) ratio (mixed metal oxide catalyst component: microporous catalyst component) ranging from 0.1:1 to 10:1, such as from 0.5:1 to 9:1.

In embodiments, the mixed metal oxide catalyst component may be reduced within the reactor prior to exposure to the feed stream 102 by exposing the mixed metal oxide catalyst component to conventional reducing gases. In other embodiments, the mixed metal oxide catalyst component may be reduced within the reactor upon exposure to reducing gases in the feed stream 102 such as $H_2$ and CO.

EXAMPLES

Embodiments will be further clarified by the following examples.

Example 1 and Comparative Examples 1 to 3

Various performance tests were carried out at 30 bar (3.0 MPa), at a temperature of 420° C., and at a gas hourly space velocities of at least 2500 hr$^{-1}$. These performance tests were completed by flowing a stream comprising syngas and a stream comprising $CO_2$ to yield a combined stream with the desired $CO_2$:CO ratio as shown in Table 1 over a catalyst comprising a mixed metal oxide catalyst component and a microporous catalyst component. In these performance tests, the mixed metal oxide catalyst component comprised gallium and the microporous catalyst component comprised SAPO-34. The results are shown in Table 1 below. The reactor effluent composition was obtained by gas chromatography and the $CO_x$ conversion was calculated using the following equation:

$$CO_x \text{ Conversion} = X_{COx}(\%) = [(n_{CO,in} + n_{CO2,in} - n_{CO,out} - n_{CO2,out})/(n_{CO,in} + n_{CO2,in})] \cdot 100. \quad (1)$$

In equation (1), $n_{CO}$ and $n_{CO2}$ are the molar flows of CO and $CO_2$ respectively.

For net $CO_2$ consumption ($CO_2$ selectivity <0), the net selectivity of product j where e.g. j=hydrocarbons and oxygenates): $S_j$ (%)=$[[(a_j \cdot n_{j,out})/(n_{CO,in} - n_{CO,out} + n_{CO2,in} - n_{CO2,out})] \cdot 100.$ (2)

For net $CO_2$ production ($CO_2$ selectivity >0), the net selectivity of $CO_2$: $S_{CO2}$ (%)=$[(n_{CO2,out} - n_{CO2,in})/(n_{CO,in} - n_{CO,out})] \cdot 100.$ (3)

For net $CO_2$ production ($CO_2$ selectivity >0), the net selectivity of product j where, e.g. j=hydrocarbons and oxygenates): $S_j$ (%)=$[(a_j \cdot n_{j,out})/(n_{CO,in} - n_{CO,out})] \cdot 100.$ (4)

For net $CO_2$-neutral operation, both equations are equal with $S_{CO2}$ (%)=0.

In equations (2) and (4), a is the number of carbon atoms for product j and $n_{j,out}$ is the molar outlet of product j.

TABLE 1

| Example | Combined Stream Composition (% $H_2$/% $CO_2$/% CO) | Mixed Metal Oxide Catalyst Component (mg) | Microporous Catalyst Component (mg) | GHSV (hr$^{-1}$) | $CO_x$ Conversion (%) | Net $CO_2$ Selectivity (%) | $C_2$-$C_4$ Olefin Productivity (g/kg cat/hr) |
|---|---|---|---|---|---|---|---|
| Ex. 1 | 69.9/8.6/21.5 | 120.1 | 39.9 | 5000 | 19.6 | 3.5 | 121.0 |
| Comp Ex. 1 | 69.9/8.6/21.5 | 200.1 | 100.1 | 3200 | 24.8 | 14 | 102.3 |

TABLE 1-continued

| Example | Combined Stream Composition (% $H_2$/% $CO_2$/% CO) | Mixed Metal Oxide Catalyst Component (mg) | Microporous Catalyst Component (mg) | GHSV ($hr^{-1}$) | $CO_x$ Conversion (%) | Net $CO_2$ Selectivity (%) | $C_2$-$C_4$ Olefin Productivity (g/kg cat/hr) |
|---|---|---|---|---|---|---|---|
| Comp. Ex. 2 | 81.25/0/18.75 | 133.4 | 133.3 | 3300 | 42 | 27.3 | 83.2 |
| Comp. Ex. 3 | 69.9/8.6/21.5 | 240.1 | 80.1 | 2500 | 25.1 | 16.8 | 79.6 |

As can be seen in Table 1, Comparative Examples 1-3 do not yield a net $CO_2$ selectivity less than 5.0%. However, Example 1 demonstrates a net $CO_2$ selectivity of less than 5.0% when operating in the presence of less catalyst, which leads to a higher gas hourly space velocity than Comparative Example 1. Although the absolute numbers for the net $CO_2$ selectivity will differ with process conditions, the examples show a general trend that the net $CO_2$ selectivity decreases as the $CO_2$ co-fed to the reactor is increased and the process is operated at a high gas hourly space velocity. As can be seen from Comparative Examples 1 and 2, with a decrease in the amount of $CO_2$ fed to the reactor, even operating at a higher space velocity does not result in a net $CO_2$ selectivity less than 5.0%.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A process for preparing $C_2$ to $C_4$ hydrocarbons comprising:
    introducing a feed stream comprising hydrogen gas and a carbon-containing gas comprising carbon monoxide into a reaction zone of a reactor;
    introducing a second stream comprising carbon dioxide into the reaction zone of the reaction;
    forming a combined stream from the feed and second stream;
    converting the combined stream into a product stream comprising $C_2$ to $C_4$ hydrocarbons in the reaction zone in the presence of a hybrid catalyst, the hybrid catalyst comprising:
    a mixed metal oxide catalyst component; and
    a microporous catalyst component, wherein a gas hourly space velocity (GHSV) inside the reaction zone of at least 4200 $hr^{-1}$, a net $CO_2$ selectivity is less than 5.0%, and a $C_2$ to $C_4$ hydrocarbon productivity of at least 75 g hydrocarbon/kg catalyst per hour.

2. The process of claim 1, wherein the second stream comprises up to 80.0 v % $CO_2$.

3. The process of claim 1, wherein the second stream consists of $CO_2$.

4. The process of claim 1, wherein the combined stream comprises greater than 6.3 v % $CO_2$.

5. The process of claim 1, wherein the combined stream comprises 50 v % to 80 v % hydrogen.

6. The process of claim 1, wherein the combined stream comprises a carbon dioxide ($CO_2$)/carbon monoxide (CO) volume ratio ($CO_2$/CO) from 0.05 to 1.5 v/v.

7. The process of claim 1, wherein the reaction zone operates at a temperature from 380° C. to 450° C.

8. The process of claim 1, wherein the reaction zone operates at a pressure from 20 bar to 70 bar.

9. The process of claim 1, wherein the GHSV is greater than 4800 $hr^{-1}$.

10. The process of claim 1, wherein the mixed metal oxide catalyst component comprises $ZrO_2$.

11. The process of claim 1, wherein the mixed metal oxide catalyst component comprises $ZrO_2$ and $Ga_2O_3$.

12. The process of claim 1, wherein the microporous catalyst component is a molecular sieve having 8-MR pore openings.

13. The process of claim 1, wherein the microporous catalyst component is SAPO-34.

14. The process of claim 1, wherein the net $CO_2$ selectivity is less than 1.0%.

15. The process of claim 1, wherein the $C_2$ to $C_4$ hydrocarbons consist essentially of $C_2$ to $C_4$ olefins.

* * * * *